(12) United States Patent
Eddins

(10) Patent No.: US 8,538,185 B1
(45) Date of Patent: Sep. 17, 2013

(54) OPTIMIZING BOUNDS CHECKING IN NEIGHBORHOOD PROCESSES

(75) Inventor: Steven L. Eddins, Milford, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/411,164

(22) Filed: Mar. 2, 2012

Related U.S. Application Data

(63) Continuation of application No. 11/641,853, filed on Dec. 20, 2006, now Pat. No. 8,165,413.

(51) Int. Cl.
*G06K 9/40* (2006.01)
(52) U.S. Cl.
USPC ............................................. 382/254
(58) Field of Classification Search
USPC ............... 382/205, 254–275, 128–134, 276, 382/279
See application file for complete search history.

(56) References Cited

U.S. PATENT DOCUMENTS

| 5,081,692 A | 1/1992 | Kwon et al. |
| 5,086,484 A | 2/1992 | Katayama et al. |
| 5,237,621 A | 8/1993 | Cox et al. |
| 8,165,413 B1 * | 4/2012 | Eddins .......................... 382/254 |
| 2001/0024519 A1 * | 9/2001 | Ohki et al. .................... 382/199 |
| 2003/0103665 A1 | 6/2003 | Uppaluri et al. |

* cited by examiner

*Primary Examiner* — Alex Liew
(74) *Attorney, Agent, or Firm* — Venable LLP; Michael A. Sartori; Todd R. Farnsworth

(57) ABSTRACT

A computer-implemented method for optimizing bounds checking in a structured lattice having a regular pattern of neighboring nodes, includes the steps of: visiting a node in the lattice in a determined order, including bounds checking the node and performing a neighborhood process on the node; when said node is an interior node, calculating a distance k to a specified node in the determined order; visiting the next k nodes in the determined order without performing bounds checking and performing a neighborhood process on each of the next k nodes; and at least one of displaying or storing a result of the neighborhood process for the node.

23 Claims, 9 Drawing Sheets

OPTIMIZING BOUNDS CHECKING IN NEIGHBORHOOD PROCESSES

CROSS-REFERENCE TO RELATED APPLICATIONS

This application is a continuation of U.S. patent application Ser. No. 11/641,853 filed Dec. 20, 2006 now U.S. Pat. No. 8,165,413, entitled "Optimizing Bounds Checking in Neighborhood Processes," which is incorporated herein by reference in its entirety.

FIELD OF THE INVENTION

The present invention relates generally to computer-implemented optimization of bounds checking in structured lattices having a regular pattern of neighboring nodes and well-defined borders. The lattice may contain, for example, image processing data such as pixels.

BACKGROUND

In image processing, a neighborhood process is one in which each image pixel is visited in a specified order. For a pixel visited, each neighbor pixel within a defined neighborhood is also visited. For example, a neighborhood of pixel p might be defined as the set of pixels immediately above, below, to the left, and to the right of p. Neighborhood processes may be used in many image processing operations, such as, e.g., convolution, median filtering, erosion, dilation, etc.

FIG. 1 illustrates an exemplary two-dimensional lattice structure 100, where each lattice node, e.g. node 102, is a pixel. If a 'neighbor' is defined as one of the four nodes that is immediately above, below, left or right of a given node, then the nodes in the gray area 104 are nodes having neighbors that are all within the lattice boundaries. Nodes having a full set of neighbors, in this example, four neighbors, are known as interior nodes. The nodes in the white area 106 each are missing at least one neighbor within the boundaries of the lattice. The nodes in border area 106 are known as boundary nodes.

FIG. 2 illustrates another exemplary two-dimensional lattice structure, where a neighbor is defined as one of the eight nodes that is immediately adjacent to a given node. Node 202 is an interior node with a full set 204 of eight neighbors. Node 206 is a boundary node with only five neighbors.

A variation of the neighborhood process is one in which pixels are processed from a queue (e.g., a first-in first-out data structure). At each step of the process, the next pixel is obtained from the queue and each of its neighbors is visited. Neighboring pixels that satisfy certain criteria are added to the queue. The process continues until the queue is empty. Queue-based neighborhood processes include, for example, the watershed transform, regional minima detection, etc.

An important consideration when implementing a neighborhood process is how to handle image boundaries. For example, if the current pixel being visited is on the top row, then there is no neighbor "above" that pixel, and any attempt to access such a non-existent pixel will cause the software to fail.

Conventional programming techniques for handling bounds checking in neighborhood processes include checking to make sure a neighbor pixel is in bounds before every attempt to visit the neighbor pixel. This technique is computationally expensive because it inserts multiple conditional branches within the inner-most loop of the software. Another technique is to pad the image boundaries so that all of the original image pixels have neighbors that are in-bounds in the padded image. This technique often runs faster because the conditional branches are eliminated, but it requires more memory in the form of an extra copy of the image. Yet another technique is to divide the image into sections, processing each section with different code. Sections near the image boundaries are processed using code that does explicit bounds-checking, whereas sections in the image interior are processed using code that does not do bounds-checking. This technique may have acceptable speed and/or memory characteristics. However, dividing an image into sections may complicate the software considerably, making programming errors more likely. Dividing and image also does not extend easily to higher dimensions, nor can it handle queue-based neighborhood processes.

SUMMARY

In an exemplary embodiment, a method, computer program product, and a system for optimization of bounds checking in structured lattices is disclosed.

In one embodiment, a computer-implemented method for optimizing bounds checking in a structured lattice having a regular pattern of neighboring nodes, may include the steps of: visiting a node in the lattice in a determined order, including bounds checking the node and performing a neighborhood process on the node; when said node is an interior node, calculating a distance k to a specified node in the determined order, where the specified node is a node between the interior node and a nearest boundary node, inclusive; visiting the next k nodes in the determined order without performing bounds checking and performing a neighborhood process on each of the next k nodes; and at least one of displaying and/or storing a result of the neighborhood process for the node.

In another embodiment, a computer-implemented method for optimizing bounds checking in a structured lattice having a regular pattern of neighboring nodes may include: (a) testing each node i in the lattice against criteria in a determined order and when a node satisfies the criteria: (i) calculating a distance $k_i$ from the node to a specified node, where the specified node is a node between the interior node and a nearest boundary node, inclusive; and (ii) putting the node and $k_i$ into a processing queue; (b) while the processing queue is not empty: (i) removing the top node and $k_i$ from the processing queue; (ii) if $k_i>0$: performing a neighborhood process on the removed node with no bounds checking; testing each neighbor of the removed node against the criteria; and adding each neighbor j that satisfies the criteria to the processing queue with a distance $k_j=k_i-1$; (iii) if $k_i=0$: performing a neighborhood process on the removed node with bounds checking; testing each neighbor j of the removed node against the criteria; and adding each neighbor j that satisfies the criteria to the processing queue with a distance $k_j$; and (c) at least one of displaying and/or storing a result of the neighborhood process for the node.

In another embodiment, a computer-readable medium comprising software, which when executed by a computer system causes the computer system to perform operations for optimizing bounds checking in a structured lattice having a regular pattern of neighboring nodes may include: (a) visiting a node in the lattice in a determined order, including bounds checking the node and performing a neighborhood process on the node; (b) when the node is an interior node, calculating a distance k to a nearest boundary node; (c) visiting the next k nodes in the determined order without performing bounds checking and performing a neighborhood process on each of the k nodes; and (d) at least one of displaying and/or storing a result of the neighborhood process for the node.

In another embodiment, a computer-readable medium comprising software, which when executed by a computer system causes the computer system to perform operations for optimizing bounds checking in a structured lattice having a regular pattern of neighboring nodes may include operations comprising: (a) testing each node i in the lattice against criteria in a determined order and when a node satisfies the criteria: (i) calculating a distance $k_i$ from the node to a nearest boundary node; and (ii) putting the node and $k_i$ into a processing queue; (b) while the processing queue is not empty: (i) removing the top node and $k_i$ from the processing queue; (ii) if $k_i>0$: performing a neighborhood process on the removed node with no bounds checking; testing each neighbor j of the removed node against the criteria; and adding each neighbor that satisfies the criteria to the processing queue with a distance $k_j=K_i-1$; (iii) if $k_i=0$: performing a neighborhood process on the removed node with bounds checking; testing each neighbor j of the removed node against the criteria; and adding each neighbor j that satisfies the criteria to the processing queue with a distance $k_j$; and (c) at least one of displaying and/or storing a result of the neighborhood process for the node.

In another embodiment, an apparatus for optimizing bounds checking in a structured lattice having a regular pattern of neighboring nodes, wherein the system is implemented in a computing device that may include: means for visiting a node in the lattice in a determined order; means for bounds checking the node to determine whether a node is a boundary node or an interior node and to determine a distance to a nearest boundary node; means for performing a neighborhood process without bounds checking on a number of consecutive interior nodes, wherein the number is determined by the distance; means for performing a neighborhood process on nodes with bounds checking; and means for displaying and/or storing a result of the neighborhood process for the node.

BRIEF DESCRIPTION OF THE DRAWINGS

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DEFINITIONS

Figure 1:
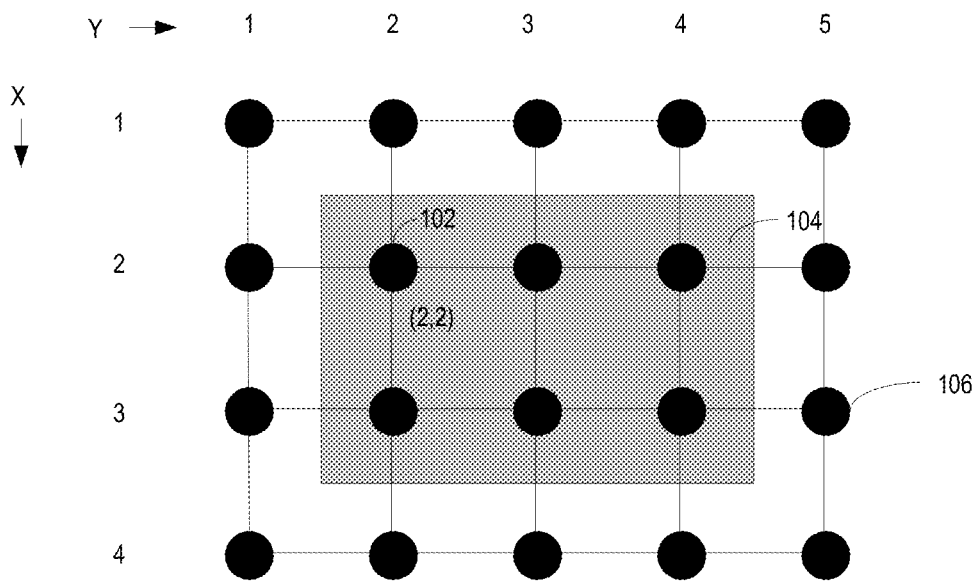
FIG. 1 depicts an exemplary embodiment of a lattice of neighboring nodes.
Figure 2:
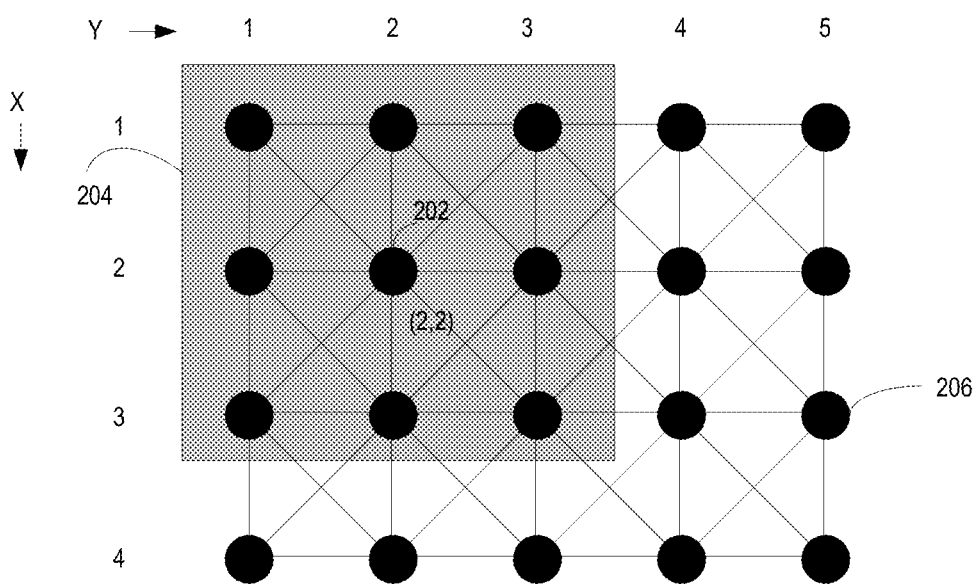
FIG. 2 depicts another exemplary embodiment of a lattice of neighboring nodes.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, multi-core processors, or general purpose on graphics processing unit (GPGPU) processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a chip, chips, or a chip set; an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EXEMPLARY EMBODIMENTS OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations may be used without parting from the spirit and scope of the invention.

While the following discussion focuses primarily on examples in the context of image processing applications, and in particular neighborhood processes involving pixels, the techniques of the present invention may be applicable in any situation where neighborhood processing takes place on data in a structured lattice having a regular pattern of interior and boundary nodes. Similarly, while the lattices discussed herein are two-dimensional, the techniques of the present invention may be applied to multidimensional lattices, as will be appreciated by one of ordinary skill in the art. For example, exemplary embodiments may apply to the solution of finite element partial differential equations.

An exemplary embodiment may be a computer-implemented technique for optimizing bounds checking when performing neighborhood processes in which most of the conventional conditional branches are eliminated, without requiring memory padding or complicated partitioning schemes. Exemplary embodiments may operate for at least two variations, one for normal neighborhood processing and one for queue-based neighborhood processing. In normal neighborhood processing, the lattice nodes are visited in the same lexicographical order each time. Lexicographical order is, generally, an ordering such as alphabetic or numerical order. For example, in a lattice of n-dimensions, lexicographical order may usually refer to ordering where (n−1) dimensions are held fixed, while one dimension is visited, e.g. visiting all elements in one row before visiting the elements in the next row.

In queue-based neighborhood processing, lattice nodes may be visited in the order in which the nodes appear in a queue for processing. The queue may be, for example, a first-in, first-out (FIFO) queue. Lattice nodes in a FIFO queue may be grouped in the queue with their neighbors. For example, a regional minima detection process may use a FIFO queue. Regional minima detection, generally, involves the detection of a connected component of pixel values having the same value t, such that pixels adjacent to the connected component all have values higher than t.

Alternatively, the queue may be a priority queue in which outputs from the queue are ordered by priority, not by order of insertion. For example, a watershed transform may use a priority queue. The term "watershed" refers to a ridge that divides areas drained by different river systems. A watershed catchment basin is the geographical area draining into a river or reservoir. In image processing, a watershed transform is a method of image segmentation, i.e. partitioning of an image into a set of non-overlapping regions, that treats pixel values in a image as "highs" and "lows" analogous to geographical elevations and depressions (catchment basins) to separate or group image elements. A watershed transform may place pixels in a priority queue during the process of assigning image pixels to labeled catchment basins.

Figure 3A:
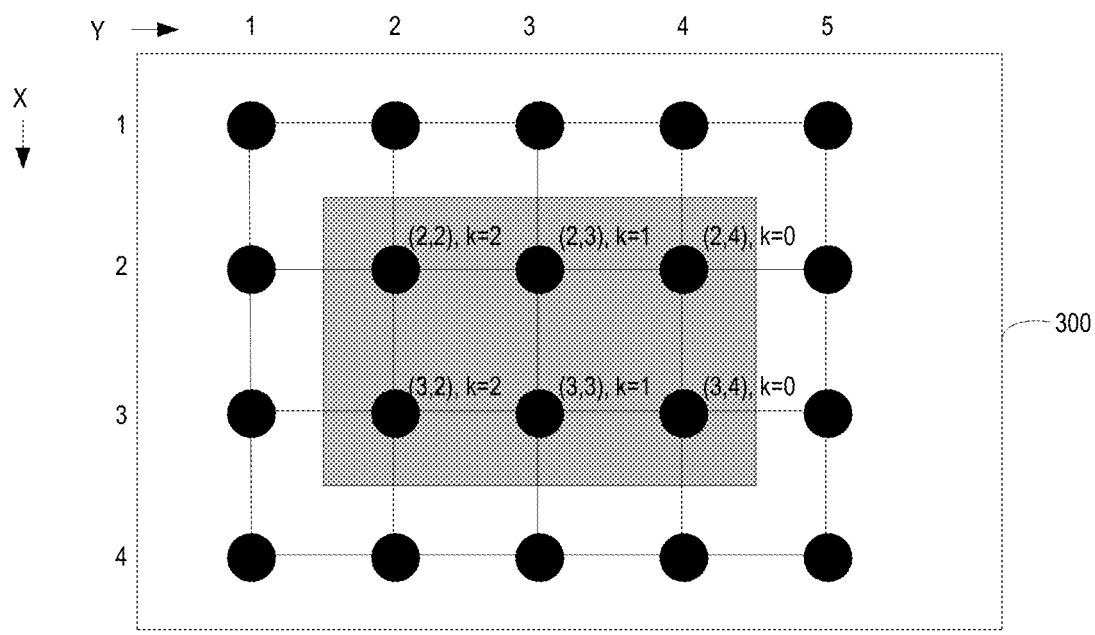
FIG. 3A depicts an exemplary embodiment of a lattice of neighboring nodes embodied on a computer readable medium.
Figure 3B:
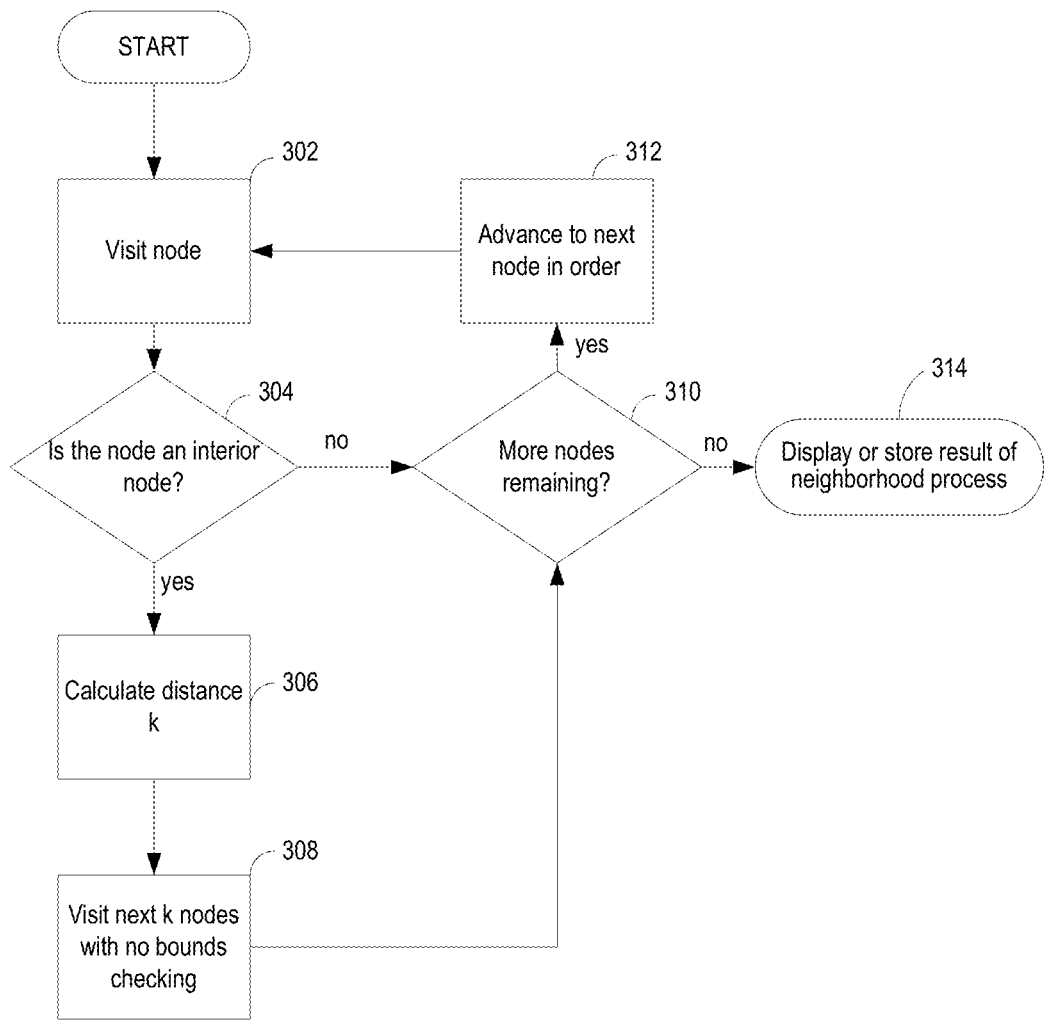
FIG. 3B depicts a flowchart of exemplary processing that can perform bounds checking.

FIG. 3A shows a lattice of nodes stored on a computer readable medium 300. FIG. 3B shows a flowchart of an exemplary technique of bounds checking for normal neighborhood processing. Normal neighborhood processing begins by visiting the pixel at a node in block 302. In the context of FIG. 3B, to "visit" a node refers to selecting a node on which to perform the neighborhood process, and performing the neighborhood process on the data represented by the node, e.g. a pixel. The neighborhood process is performed, e.g., a convolution. If the visited node is an interior node, in block 304, the distance k, in number of interior nodes, to a specified node, e.g. to the next boundary node, or to any node between, and including, the visited node and the next boundary node, (according to the direction of visits) is determined in block 306. The distance k is determined from the dimensions of the lattice. For example, in reference to FIG. 3A, the (2,2) node may be the first node encountered whose neighbors are all in-bounds. If the lattice in FIG. 3A is being visited row-wise, k=2. For the next k nodes, neighbor-visiting code that does no bounds checking is used, in block 308, e.g., for nodes (2,3) and (2,4). In practice, a counter may be set with an initial value of k. Each time another node is visited, the counter may be decremented. Once all of the k nodes have been visited, if there are further nodes to process in block 310, the next node is selected in block 312, and the visiting process repeats starting at block 302. Otherwise, the neighborhood processing ends at block 314, where the result of the neighborhood process on the node(s) may be displayed and/or stored. The bounds-checking cost per pixel is reduced, on average, to one decrement (of the counter) and one comparison to zero. This technique may be completely encapsulated using "smart" neighborhood iterators, which may make the software conceptually easy to write, read, and maintain, as well as being efficient.

In an exemplary embodiment, the visiting of nodes may be performed independently on a different computer in a distributed cluster, or on a different parallel thread.

Figure 4:
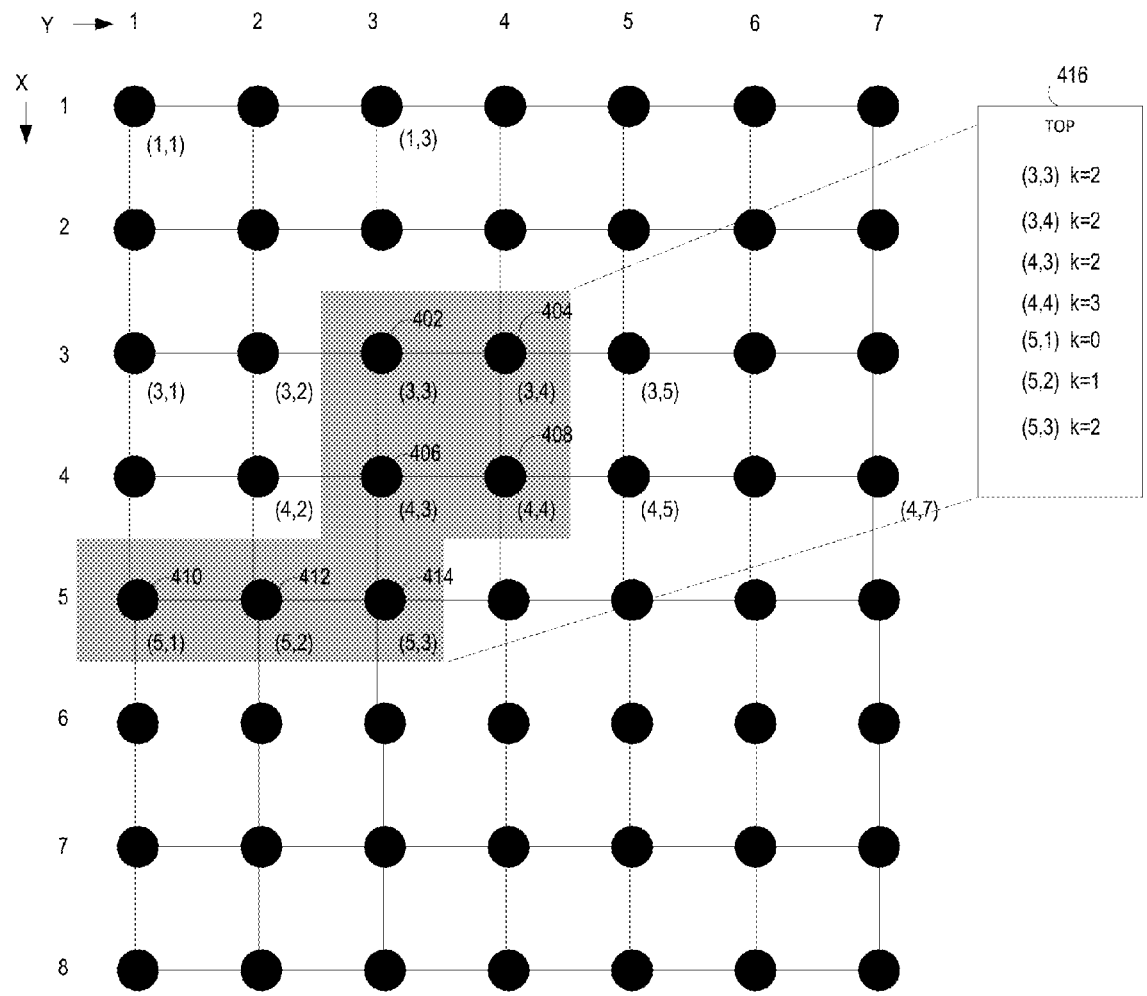
FIG. 4 depicts an exemplary embodiment of a lattice with queued nodes.

FIG. 4 illustrates a lattice where nodes may be processed in a queue. The nodes in the shaded areas are the nodes to be added to a queue 416, with their associated distances as explained below, for processing. This may occur, for example, in a watershed transform, a regional minima detection, etc. Other queue-based processes may be contemplated, where a node may need to be "processed" based on a relationship to neighboring nodes, rather than based on mere presence in the lattice.

Figure 5:
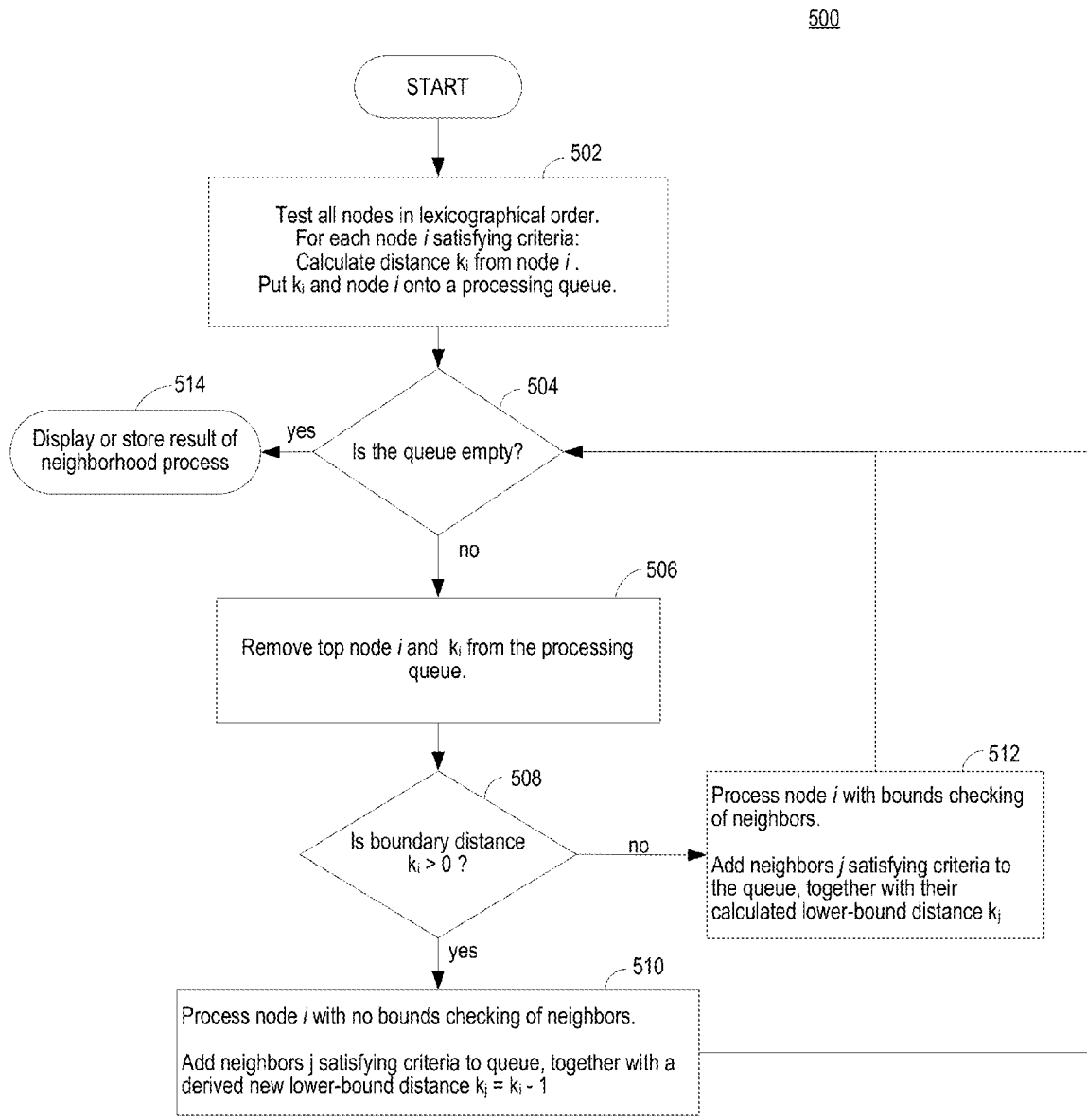
FIG. 5 depicts a flowchart of exemplary processing that can be used to perform bounds checking of queued nodes.

FIG. 5 depicts a flowchart 500 of an exemplary embodiment of queue-based neighborhood processing. Initially, in block 502, each of the nodes in the lattice is tested once in lexicographical order. For each node i that meets one or more criteria defined by the particular neighborhood process, the distance $k_i$ in number of nodes is calculated from node i to a specified node, e.g. to the nearest boundary node, or to any node between, and including, the visited node and the nearest boundary node. The distance $k_i$ may be the lower bound of the number of steps that can be taken from node i, following any path, before encountering a boundary node. For some neighborhood processes, some pre-processing of the pixel associated with the node may occur. Each node i that meets the criteria, and the distance are placed in a processing queue.

If the processing queue is not empty in block 504, the top node i is removed from the queue, with the corresponding distance $k_b$ in block 506. If the distance $k_i$ to the nearest boundary is greater than zero, in block 508, node i is processed, including visiting each neighbor of node i in block 510 without bounds checking. If any of the neighbor nodes also meets the criteria used in block 502, and that node is not already on the queue, that node j is added to the processing queue with its new lower-bound distance, $k_j-1$.

If the lower-bound boundary distance $k_i$ is not greater than zero in block 508, then node i is processed with bounds checking of its neighbors in block 512. If a neighbor node j of node i meets the criteria used in block 502, then the lower-bound distance $k_j$ is computed, and the node j is added to the processing queue together with $k_j$. When the queue is empty, neighborhood processing ends at block 514, where the result of the neighborhood process on the node(s) may be displayed and/or stored For example, using the lattice illustrated in FIG. 4, suppose the following nodes (x,y) ultimately belong in the processing queue: {(3,3) [402], (3,4) [404], (4,3) [406], (4,4) [408], (5,1) [410], (5,2) [412], (5,3) [414]}. In block 502, nodes (1,1) to (3,2) are tested (row-wise) according to the neighborhood process criteria, but are not placed in the queue. When node (3,3) is tested, it meets the criteria and the distance k to its nearest boundary node is calculated, i.e., the distance to (3,1) or (1,3), k=2. Node (3,3) and k=2 are placed in the queue. Next, node (3,4) is tested and placed in the queue with k=2. Nodes (3,5) through (4,2) are not placed in the queue. Node (4,3) is placed in the queue, with k=2. Node (4,4) is placed in the queue with k=3. Nodes (4,5) through (4,7) are not placed in the queue. Node (5,1) is placed in the queue with k=0. Node (5,2) is placed in the queue with k=1. Node (5,3) is placed in the queue with k=2.

In block 504, the queue is not empty. In block 506, the top node in the queue, node (3,3) and distance k=2 are removed from the queue. In block 508, k=2, so in block 510, node (3,3) is processed, including visiting the neighbor nodes without bounds checking. The same process repeats in blocks 504, 506, 508, and 510 for nodes (3,4), (4,3), (4,4). When node (5,1) is removed from the queue, its distance k=0, because node (5,1) is a boundary node. Therefore, in block 512, node (5,1) is processed with bounds checking of its neighbors. Node (5,2) is removed from the queue and processed in a manner similar to that for node (3,3). Finally node (5,3) is processed in a manner similar to that for node (3,3).

In an exemplary embodiment, nodes might represent output image pixels calculated from a linear combination of input neighbor pixels. These nodes may be displayed on the screen as pixels in a new image, or they may be saved to disk as an image file, such as a TIFF file.

In another exemplary embodiment, nodes may represent the locations of regional minima in an image; these nodes may be displayed as a binary image whose foreground pixels indicate the locations of the regional minima. These nodes might also be saved to disk in the form of a binary image file.

In another exemplary embodiment, nodes may represent the association between input image pixels and a numbered set of watershed catchment basins. These nodes may be displayed on the screen as an image in which the pixels belonging to each catchment basin, i.e., the "low" pixels, are given a unique color. These nodes might also be saved to disk in the form of an indexed image in a standard image file format, such as TIFF, PNG, or GIF.

Neighborhood processes may be implemented, for example, through the Image Processing Toolbox and the Video and Image Processing Blockset of MATLAB®, available from The MathWorks, Inc. of Natick, Mass., USA. Some exist in MATLAB® as well, such as two dimensional and multidimensional convolution.

Figure 6:
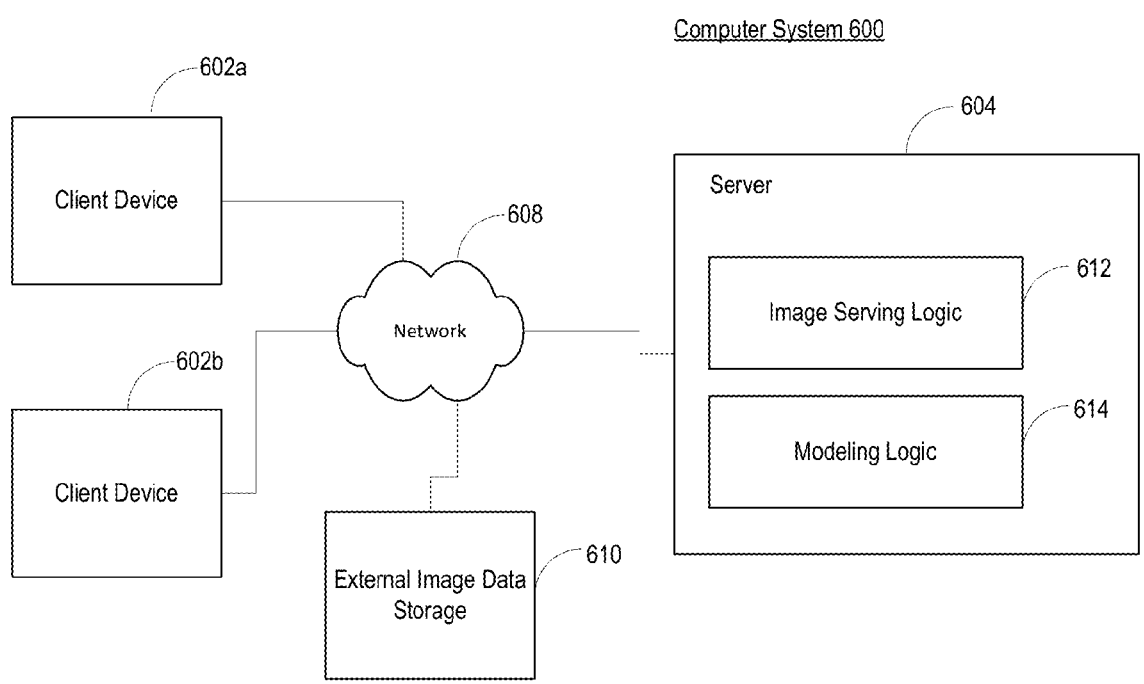
FIG. 6 depicts a networked computer system for use with exemplary embodiments.

FIG. 6 depicts a networked computer system 600 for use with embodiments of the present invention. Computer system 600 may include one or more client devices 602a, 602b. Client devices 602 may be computers or computer systems. Client devices 602 may be in communication with a server 604 over a network 608. Server 604 may provide image data to client devices 602, for example, image data stored on external storage 610. Server 604 may further include image serving logic 612 and modeling logic 614.

Figure 7:
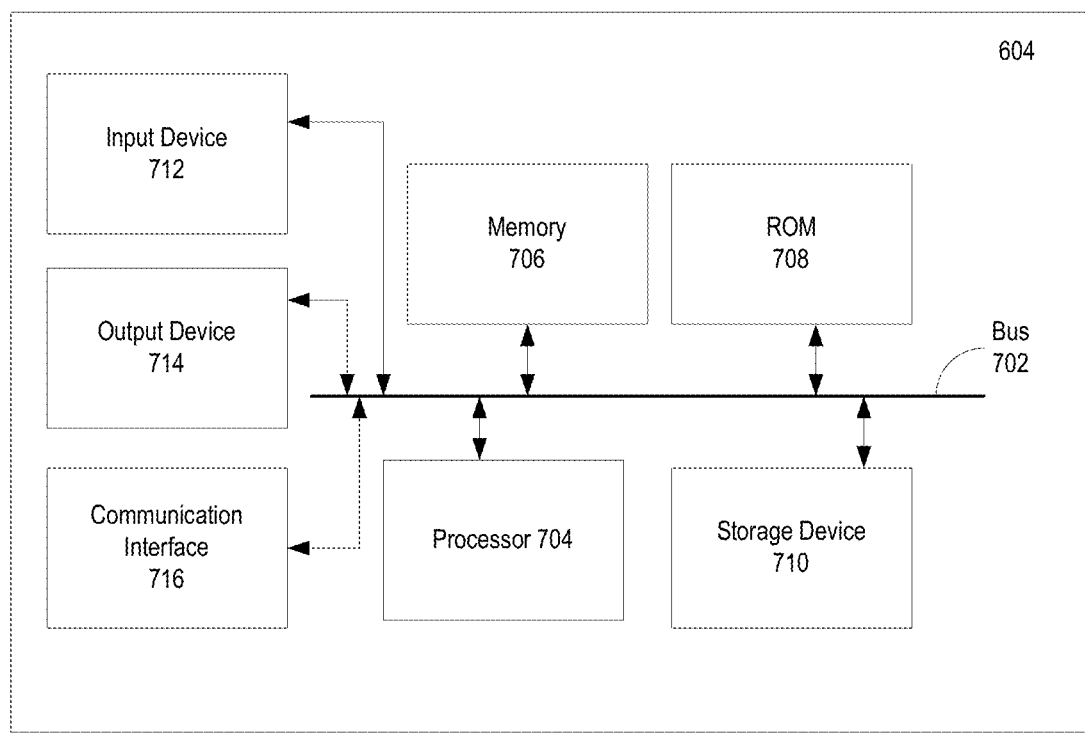
FIG. 7 depicts a computer architecture block diagram of a computer for use with exemplary embodiments.

FIG. 7 illustrates an exemplary architecture for implementing server 604 of FIG. 6. As illustrated in FIG. 6, server 604 may include a bus 702, a processor 704, a memory 706, a read only memory (ROM) 708, a storage device 710, an input device 712, an output device 714, and a communication interface 716.

Bus 702 may include one or more interconnects that permit communication among the components of server 604. Processor 704 may include any type of processor, microprocessor, or processing logic that may interpret and execute instructions (e.g., a field programmable gate array (FPGA)). Processor 704 may include a single device (e.g., a single core) and/or a group of devices (e.g., multi-core). Memory 706 may include a random access memory (RAM) or another type of dynamic storage device that may store information and instructions for execution by processor 704. Memory 706 may also be used to store temporary variables or other intermediate information during execution of instructions by processor 704.

ROM 708 may include a ROM device and/or another type of static storage device that may store static information and instructions for processor 704. Storage device 710 may include a magnetic disk and/or optical disk and its corresponding drive for storing information and/or instructions. Storage device 710 may include a single storage device or multiple storage devices, such as multiple storage devices operating in parallel. Moreover, storage device 710 may reside locally on server 604 and/or may be remote with respect to server 604 and connected thereto via network 608 and/or another type of connection, such as a dedicated link or channel.

Input device 712 may include any mechanism or combination of mechanisms that permit an operator to input information to server 604, such as a keyboard, a mouse, a touch sensitive display device, a microphone, a pen-based pointing device, and/or a biometric input device, such as a voice recognition device and/or a finger print scanning device. Output device 714 may include any mechanism or combination of mechanisms that outputs information to the operator, including a display, a printer, a speaker, etc.

Communication interface 716 may include any transceiver-like mechanism that enables server 604 to communicate with other devices and/or systems. For example, communication interface 716 may include one or more interfaces, such as a first interface coupled to network 608 and/or a second interface coupled to a license manager (not shown). Alternatively, communication interface 716 may include other mechanisms (e.g., a wireless interface) for communicating via a network, such as a wireless network. In one implementation, communication interface 716 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Server 604 may perform certain functions in response to processor 704 executing software instructions contained in a computer-readable medium, such as memory 706. A computer-readable medium may be defined as one or more memory devices. In alternative embodiments, hardwired circuitry may be used in place of or in combination with software instructions to implement features consistent with principles of the invention. Thus, implementations consistent with principles of the invention are not limited to any specific combination of hardware circuitry and software.

Figure 8:
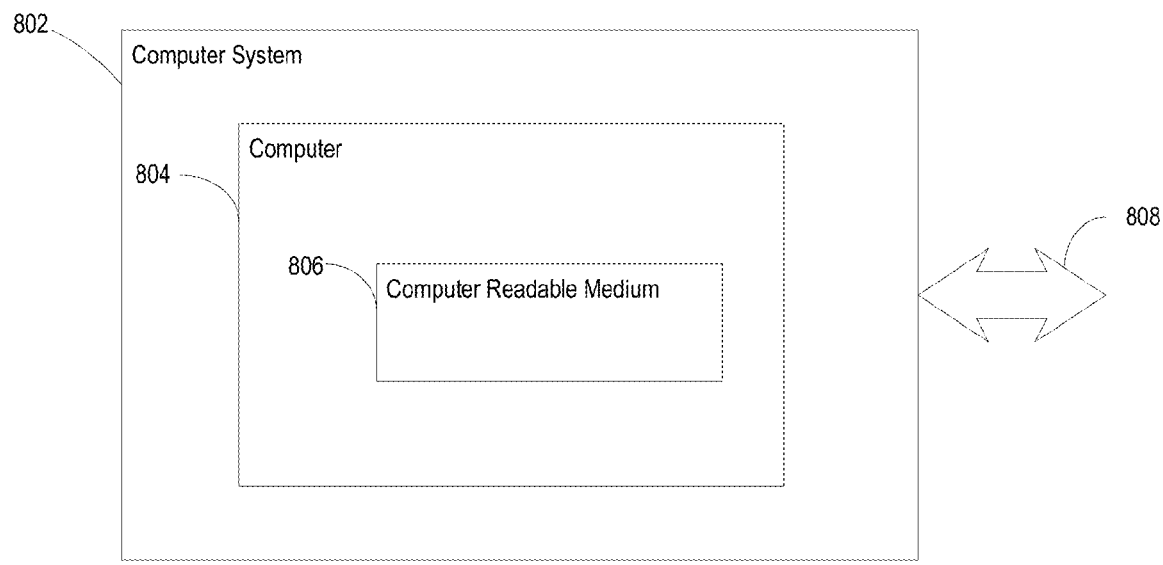
FIG. 8 depicts a computer for use with exemplary embodiments.

FIG. 8 depicts a computer system for use with exemplary embodiments. The computer system 802 includes a computer 804 for implementing the invention. The computer 804 includes a computer-readable medium 806 embodying software for implementing the invention and/or software to operate the computer 804 in accordance with the invention. As an option, the computer system 802 includes a connection to a network 808. With this option, the computer 804 is able to send and receive information (e.g., software, data, documents) from other computer systems via the network 808.

Figure 9:
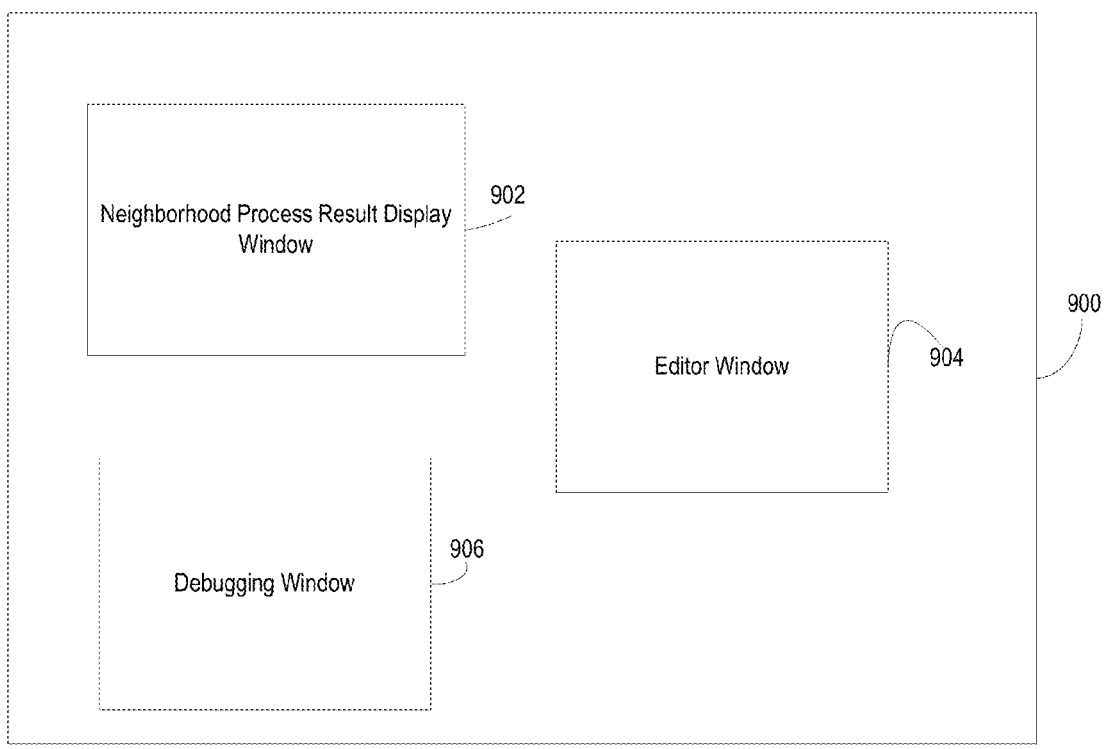
FIG. 9 depicts an exemplary user interface for use in interacting with software that performs the techniques of the exemplary embodiments.

FIG. 9 depicts an exemplary graphical user interface (GUI) 900 for use with exemplary embodiments. The GUI 900 may have, for example, a window 902 that displays the results of the neighborhood processing. The GUI 900 may also have an editor window 904 that may allow the user to edit software code, or make modifications to software settings. The GUI 900 may also have a debugging window 906 that may allow the user to locate errors in software. The types and functionality of GUI components may vary according to the software that performs the techniques described herein.

Exemplary embodiments may be embodied in many different ways as a software component. For example, it may be a stand-alone software package, or it may be a software package incorporated as a "tool" in a larger software product, such as, for example, a mathematical analysis product, or an image processing and analysis product. It may be downloadable from a network, for example, a website, as a stand-alone product or as an add-in analysis package for installation in an existing software application. It may also be available as a client-server software application, or as a web-enabled software application. The present invention may also be circuit-based, for example, for use in portable cameras or video recorders.

Exemplary embodiments may exist as part of a text-based technical computing environment, such as, e.g. MATLAB® of The MathWorks, Inc. of Natick, Mass., USA. The techniques described herein may be embodied in functional components of such a technical computing environment, such as, for example, in a function, a model, a class, or other program element. Exemplary embodiments may exist as part of a technical computing environment that has graphical models and may use graphical programming language, such as, e.g. SIMULINK® and STATEFLOW®, of The MathWorks, Inc. of Natick, Mass., USA. The techniques described herein may be embodied in functional components of such a technical computing environment, such as, for example, in a simulation block, or a simulation toolset.

While various embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method for optimizing bounds checking in a structured lattice having neighboring nodes, the method comprising:
   visiting a node in the lattice, the visiting:
      performed using a processor,
      including bounds checking the node, and
      performing a neighborhood process on the node;
   calculating, by the processor, a distance to a specified node, wherein the specified node is between an interior node and a nearest boundary node to the node, the specified node, the interior node, and the nearest boundary node being nodes in the lattice;
   visiting a plurality of nodes in the lattice based on the calculated distance, the visiting:
      performed using the processor,
      performed without bounds checking, and
      including performing a neighborhood process on the visited nodes;
   determining, by the processor, whether a node of the visited nodes satisfies criteria, wherein the node of the visited nodes is added to a processing queue when the node of the visited nodes satisfies the criteria;
   determining, by the processor, a lower-bound distance from the node of the visited nodes to a nearest boundary node of the node of the visited nodes, wherein the lower-bound distance is added to the processing queue with the node of the visited nodes; and
   wherein neighborhood processing occurs only on nodes in the processing queue.

2. The method according to claim 1, further comprising:
   repeating for nodes in the lattice: visiting the node, calculating the distance, and visiting the plurality of nodes.

3. The method according to claim 1, wherein visiting the node comprises visiting nodes in the lattice in a lexicographical order.

4. The method according to claim 1, wherein the performing a neighborhood process comprises:
   performing at least one of: a solution of finite element partial differential equations, an image convolution, an image median filtering, an image erosion, or an image dilation.

5. The method according to claim 1, wherein the structured lattice is multi-dimensional.

6. The method according to claim 5, wherein the structured lattice is two-dimensional.

7. The method according to claim 5, wherein the structured lattice is three-dimensional.

8. The method according to claim 1, wherein the distance is the distance to a nearest boundary node.

9. A computer-implemented method for optimizing bounds checking in a structured lattice having a pattern of neighboring nodes comprising:
   downloading software to a computer system, which when executed by the computer system causes the computer system to perform operations comprising the method of claim 1.

10. A computer-implemented method for optimizing bounds checking in a structured lattice having a pattern of neighboring nodes comprising:
    providing downloadable software to a computer system, which when executed by the computer system causes the computer system to perform operations comprising the method of claim 1.

11. The method of claim 1, wherein the processor implements visiting the node in the lattice as a functional component of at least one of: a text-based technical computing environment or a technical computing environment having graphical models.

12. The method of claim 11, wherein providing the method as a functional component of a technical computing environment having graphical models includes graphical models using a graphical programming language.

13. The method of claim 1, further comprising at least one of displaying or storing a result of the neighborhood process for the node.

14. A non-transitory computer-readable medium comprising software, which when executed by a computer system causes the computer system to perform operations for optimizing bounds checking in a lattice having neighboring nodes, the operations comprising:
   visiting a node in the lattice, including bounds checking the node and performing a neighborhood process on the node;
   when the node is an interior node, calculating a distance to a nearest boundary node of the node, the nearest boundary node being in the lattice;
   visiting a plurality of nodes in the lattice based on the calculated distance without performing bounds checking and performing a neighborhood process on the visited nodes;
   determining whether a node of the visited nodes satisfies criteria, wherein the node of the visited nodes is added to a processing queue when the node of the visited nodes satisfies the criteria;
   determining a lower-bound distance from the node of the visited nodes to a nearest boundary node of the node of the visited nodes, wherein the lower-bound distance is added to the processing queue with the node of the visited nodes; and
   wherein neighborhood processing occurs only on nodes in the processing queue.

15. The computer-readable medium according to claim 14, the operations further comprising:
   repeating visiting the node, calculating the distance, and visiting the plurality of nodes for nodes in the lattice.

16. The computer-readable medium according to claim 14, wherein visiting the node comprises visiting nodes in the lattice in a lexicographical order.

17. The computer-readable medium according to claim 14, wherein performing a neighborhood process comprises performing at least one of: a solution of finite element partial differential equations, an image convolution, an image median filtering, an image erosion, or an image dilation.

18. The computer-readable medium according to claim 14, wherein the software is a functional component of at least one of: a text-based technical computing environment or a technical computing environment having graphical models.

19. The computer-readable medium according to claim 14, further comprising displaying or storing a result of the neighborhood process for the node.

20. An apparatus for optimizing bounds checking in a structured lattice having neighboring nodes, wherein the apparatus is implemented in a computing device and causes the computing device to perform operations comprising:
   visiting a node in the lattice using the computing device;
   bounds checking the visited node to determine whether the visited node is a boundary node or an interior node and to determine a distance to a nearest boundary node of the visited node, the nearest boundary node of the visited node being in the lattice;
   performing a neighborhood process without bounds checking on a number of interior nodes of the lattice, wherein the number is determined by the distance;
   performing a neighborhood process on nodes of the lattice with bounds checking;
   determining whether a node of the lattice satisfies criteria using the computing device, wherein the node of the lattice is added to a processing queue when the node of the lattice satisfies the criteria;
   determining a lower-bound distance from the node of the lattice to a nearest boundary node of the node of the lattice, wherein the lower-bound distance is added to the processing queue with the node of the lattice; and
   wherein neighborhood processing occurs only on nodes in the processing queue.

21. The apparatus of claim 20, wherein the operations further comprise displaying or storing a result of the neighborhood process for the node.

22. The apparatus of claim 20, wherein the computing device is at least one of: a multi-core computing device, a distributed computing device, a parallel processing computing device, or a general purpose on graphics processing unit computing device.

23. A non-transitory computer-readable medium comprising software, which when executed by a computer system causes the computer system to perform operations for optimizing bounds checking in a structured lattice having neighboring nodes, the operations comprising:
   visiting a node in the lattice;
   bounds checking the node to determine whether the bounds checked node is a boundary node or an interior node and to determine a distance to a nearest boundary node of the bounds checked node;
   performing a neighborhood process without bounds checking on a number of consecutive interior nodes of the lattice, wherein the number is determined by the distance;
   performing a neighborhood process on nodes of the lattice with bounds checking;
   determining whether a node of the lattice satisfies criteria using the computing device, wherein the node of the lattice is added to a processing queue when the node of the lattice satisfies the criteria;
   determining a lower-bound distance from the node of the lattice to a nearest boundary node of the node of the lattice, wherein the lower-bound distance is added to the processing queue with the node of the lattice; and
   wherein neighborhood processing occurs only on nodes in the processing queue.

* * * * *